SYNCHRO-MOTOR

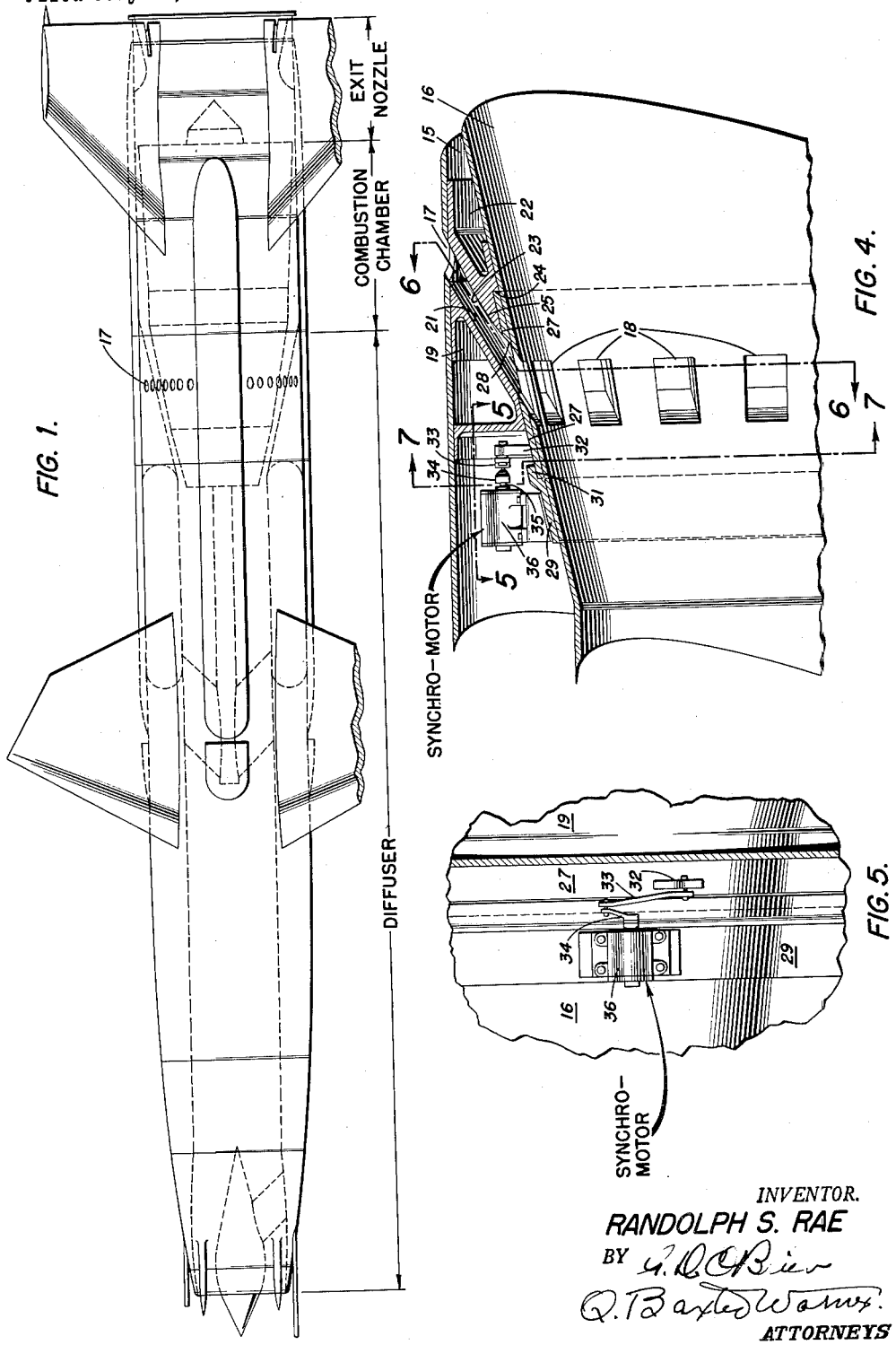
April 3, 1962 R. S. RAE 3,027,712
MEANS FOR VARYING THE THRUST OF A RAM-JET
Filed July 16, 1952 5 Sheets-Sheet 1
INVENTOR.
RANDOLPH S. RAE
ATTORNEYS April 3, 1962 R. S. RAE 3,027,712
MEANS FOR VARYING THE THRUST OF A RAM-JET
Filed July 16, 1952 5 Sheets-Sheet 2

INVENTOR
RANDOLPH S. RAE
BY
ATTORNEYS

April 3, 1962 R. S. RAE 3,027,712
MEANS FOR VARYING THE THRUST OF A RAM-JET
Filed July 16, 1952 5 Sheets-Sheet 3

INVENTOR.
RANDOLPH S. RAE
BY
ATTORNEYS

April 3, 1962 — R. S. RAE — 3,027,712
MEANS FOR VARYING THE THRUST OF A RAM-JET
Filed July 16, 1952 — 5 Sheets-Sheet 4

INVENTOR.
RANDOLPH S. RAE
ATTORNEYS

April 3, 1962 R. S. RAE 3,027,712
MEANS FOR VARYING THE THRUST OF A RAM-JET
Filed July 16, 1952 5 Sheets-Sheet 5

INVENTOR.
RANDOLPH S. RAE
BY
ATTORNEYS

United States Patent Office 3,027,712
Patented Apr. 3, 1962

3,027,712
MEANS FOR VARYING THE THRUST
OF A RAM-JET
Randolph S. Rae, Silver Spring, Md., assignor to the United States of America as represented by the Secretary of the Navy
Filed July 16, 1952, Ser. No. 299,125
12 Claims. (Cl. 60—35.6)

The present invention relates to an improved process and apparatus for obtaining variations of thrust in ramjet missiles.

Guided missiles of the ramjet type, in seeking their intended quarry, are made to perform manifold aerial maneuvers requiring large variations in thrust. For example, the thrust of a ramjet required during the initial climbing phase of flight is much greater than that required for cruising. Thus, it has become desirable to provide in a ramjet missile the flexibility of functioning under a wide range of flight conditions, while at the same time meeting the requirements of on-design and high efficiency operation.

Briefly, the thrust in a ramjet is attained by burning fuel in the combustion chamber, thereby raising the temperature of the air passing therethrough. Air at an elevated temperature in the combustion chamber, and supplemented by the volume of gaseous combustion products, has a two-fold purpose; first, to maintain an adequate back pressure to permit high efficiency operation of the diffuser and, second, to cause the exit gases to emerge from the exit nozzle with a higher velocity and, consequently, a higher momentum than they possessed upon entering the diffuser. This increase in momentum of the exhaust gases is accompanied by an equal reactionary momentum of the missile which is manifest in thrust.

For a more thorough presentation of the fundamental theory of ramjet performance, reference is made to the following publications: "The Ramjet as a Supersonic Propulsion Plant," by W. H. Goss and Emory Cook; published in SAE Quarterly Transactions; October 1948, and "The Flying Stovepipe—How it Works" by J. P. D'Arezzo and W. B. Sigley; published in The Coast Artillery Journal, January to February 1947. Further information on this subject may be obtained from the co-pending application "Ram Jet Motor," Serial No. 659,188, filed by David H. Sloan et al. on April 3, 1946.

Heretofore, two methods of varying the thrust of a ramjet type missile were available. The first method entailed the regulation of heat released by the burning fuel in the combustion chamber. Thus, in order to produce a reduction in thrust, the amount of fuel burned was reduced, causing a drop of pressure in the combustion chamber and decreasing the velocity of the exhaust gases. A decrease in momentum of the exhaust gases resulted and the thrust of the ramjet fell off. However, concomitant with the reduction of pressure in the combustion chamber, the shock wave formerly attached to the lip of the diffuser was swallowed and the missile was caused to operate below design efficiency. Such inefficiency required that a certain amount of fuel be expended unnecessarily.

Similarly, when an increase in thrust was desired, the amount of fuel burned was increased, thereby increasing the pressure in the combustion chamber and increasing the velocity of the exhaust gases. In this instance an increase in the momentum of the exhaust gases resulted and the thrust of the ramjet became greater. However, because of the increase of pressure in the combustion chamber, the shock wave was pushed forward, away from the lip of the diffuser, and spillover occurred. Here, also, the missile operated below design efficiency and a certain amount of fuel was wasted. It thus can be seen that the foregoing method was particularly undesirable because of the off-design operation of the missile when the thrust was varied.

Th second method entailed a variation of geometry of the exit nozzle. By changing the geometry of the exit nozzles the velocity and momentum of the exhaust gases was varied, thus varying the thrust. With a variable exit nozzle the ramjet could always be operated on-design, and high efficiency resulted over a wide range of thrust variations. The objectionable feature of this method was not the unnecessary fuel expended in varying thrust but the difficulties involved in designing and constructing the variable exit nozzle. The difficulty of construction of a variable exit nozzle can be well appreciated in view of its mechanical complexity and the high temperatures under which it is made to operate.

It is, therefore, an object of this invention to provide means for varying the thrust of a ramjet over a wide range while at the same time maintaining on-design operation at high efficiency.

Another object of this invention is to provide means for producing a variation of thrust in a ramjet which is simple to implement and which will not be subjected to the deleterious effects of hot combustion gases.

A further object is to provide means for varying the thrust of a ramjet over a wide range without affecting the on-design and high efficiency operation of the ramjet and without imposing undue complexities on the design and construction thereof.

Further objects and advantages of this invention will become evident from a reading of the following detailed description, taken in conjunction with the drawings appended hereto, in which:

FIG. 1 is an elevation of a ramjet missile illustrating the outlet ports of the variable drain valve and, in dotted lines, the duct configuration including the diffuser, combustion chamber and nozzle;

FIG. 4 is a fragmentary section taken in the region of the diffuser exit of a ramjet missile with the combustor removed, illustrating the variable drain valve;

FIG. 5 is a fragmentary sectional view on line 5—5 of FIG. 4;

The present invention obtains a variation of thrust in a ramjet by diverting a quantity of air ahead of the combustion chamber into the atmosphere. A variable drain valve is provided at the exit of the diffuser, just ahead of the combustion chamber, and is constructed in a way which will allow the by-passed air to expand isentropically to ambient pressure. When the variable drain valve is closed, and for a given rate of fuel flow, the back pressure from the burner corresponds to the design condition at a given thrust. When the variable drain valve is opened and some of the air is allowed to drain out, the remaining flow through the combustion chamber must be augmented, pressure-wise, in order to prevent swallow of the shock wave and off-design operation. An adequate back-pressure is maintained by increasing the rate of fuel combustion, thereby producing a larger volume of air-combustion gas mixture and increasing the temperature of the exhaust gases. The exhaust gases, now, emerge with a greater velocity and momentum, and the missile thrust is increased.

A greater increase in thrust may be attained by diverting more air from the diffuser exit. In this case an even larger back-pressure must be maintained in the combustion chamber, and, consequently a greater rate of fuel combustion is required. A greater increase in temperature and volume of exhaust gases is obtained and a greater exit velocity and momentum of the gases result to produce a greater thrust. In like manner, a lesser thrust is obtained by diverting a smaller quantity of air from the diffuser exit.

It should be stressed at this point that although a greater amount of fuel must be burned to produce a greater thrust, the ramjet operates at all times on-design and no fuel is consumed unnecessarily. This is to be distinguished from the first, previously known method described above in which the fuel combustion rate is increased to obtain greater thrust at a sacrifice, however, of operating efficiency.

If the diffuser were one hundred percent efficient no drag would be produced by the effluent air, since the air when isentropically expanded to the atmosphere would attain the same velocity that it possessed upon entering the unit. In practice, however, the diffuser is less than one hundred percent efficient and a slight amount of drag is produced to decrease thrust. Nevertheless, this decrease in thrust has been found to be little more than negligible. It is to be strongly emphasized that an isentropic expansion of the air through the drain valve is requisite from the standpoint of the conservation of velocity-energy and minimization of drag forces.

Figure 2:
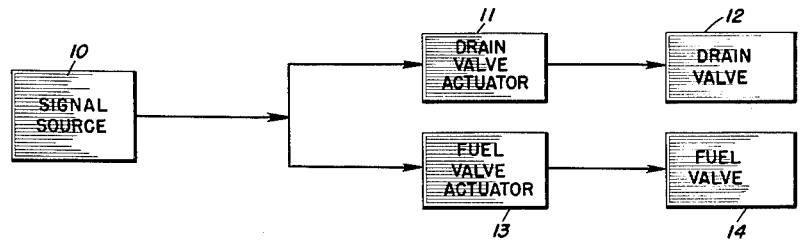
FIG. 2 is a block diagram illustrating the system for varying thrust.

Referring now to the figures of the drawings, and in detail to FIG. 2, the system of varying thrust includes a source of signals 10 which may be in the form of a guidance control unit, a radio receiver deriving intelligence signals from the ground, or an air speed indicator. The signal source 10 transmits a signal indicative of the desired change in thrust to a drain valve actuator 11 which mechanically operates a drain valve 12 for regulating the amount of air drained from the diffuser exit.

A corresponding signal, preferably but not necessarily originating from the same source, is transmitted to a fuel valve actuator 13 which mechanically operates a fuel valve 14 for regulating the flow of fuel to the combustion chamber. The regulation of fuel flow must be commensurate with the amount of air drained, in order that a sufficient back pressure be maintained in the combustion chamber to hold the shock wave on the lip of the diffuser and permit on-design operation.

Suitable apparatus for draining air and controlling the amount of drain from the diffuser exit now will be described, with particular reference to FIGS. 4, 5, 6 and 7. A ramjet missile body is defined by an outer wall or skin 15 and an inner wall or skin 16. The outer skin 15 is formed with a series of ports 17, peripherally disposed in spaced relation to each other, and the inner skin 16 is constructed with a series of openings 18 also peripherally disposed in spaced relation to each other. The ports 17 and the openings 18 are located in the region of the diffuser exit.

An annulus 19, of angular cross-section and having a uniform conical surface 21, is secured to the outer skin 15 between said outer skin and the inner skin 16. A ring 22, also of angular cross-section and having a conically shaped inwardly curved surface 23 is disposed between said outer skin and said inner skin and is fastened to both of said skins. The ring 22 is further formed with an annular recess 24 defining a lip 25. The annulus 19 and the ring 22 are disposed with respect to each other so as to define a substantially conically shaped channel 26 extending completely around the missile body and communicating the openings 18 with the ports 17. The inwardly curved surface 23 and the conical surface 21 are so shaped that the channel 19 gradually becomes larger towards the ports 17 so that isentropic expansion of the air passing through it is permitted. A flat conical band 27 is rotatably situated between the annulus 19 and the inner skin 16 and under the lip 25 of the ring 22. The band 27 conforms to the conical shape of that portion of said inner skin at the diffuser exit and has formed in it a series of slots 28 peripherally disposed in spaced relation to each other and corresponding in size, shape and number to the openings 18 through said inner skin. A second conical band 29 is securely attached to the inner skin just forward of the rotatable band 27. The second band 29 is formed with a flange 31 which overlaps the fore end of the rotatable band 27 and constrains said band to rotary motion.

A bracket 32 is mounted on the rotatable band 27 and is connected by a connecting rod 33 to a crank 34 mounted on the rotor 35 of a synchro-motor 36 which is securely fixed to the second band 29. The synchro-motor 36 is actuable responsive to signals transmitted by the signal source 10.

Figure 3:
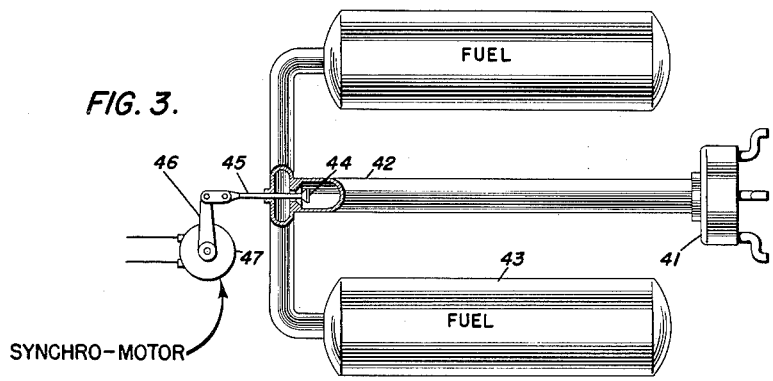
FIG. 3 is a diagrammatic view showing a suitable fuel injection system including a fuel flow regulator.

A suitable fuel injection system for introducing fuel into the combustion chamber is shown diagrammatically in FIG. 3. More particularly, there is illustrated a fuel injector 41 which is connected by a fuel line 42 to pressurized fuel tanks 43. The fuel line 42 is controllable by a valve 44 having a valve stem 45 which is connected to a crank 46 mounted upon the rotor of a synchro-motor 47. The synchro motor is electrically connected to receive signals from the signal source 10.

In operation, a signal is fed into the synchro-motor 36 of the drain valves causing the rotor 35 to rotate to a position determined by the character of the signal. The rotor 35 turns the crank 34 which, through the connecting rod 33 and bracket 32, imparts sliding rotary motion to the band 27. The band 27, being constrained to rotary motion, operates to aline or misaline the slots 28 of said band with the openings 18 of the inner skin 16, so as to vary the area of direct flow from the diffuser into the channel 26.

When the slots 28 and the openings 18 are in alinement, the maximum amount of air is drained from the diffuser. As the air passes through the channel 26 it expands isentropically to the ambient pressure and exits to the atmosphere through the ports 17. Other than isentropic expansion precludes the attainment of maximum velocity of the effluent air so that the drag forces produced by said effluent air are not reduced to a minimum and the maximum possible thrust is not attained.

The same or identical signal is simultaneously, with its application to motor 36, applied to the synchro-motor 47 of the fuel flow regulator. The rotor of said synchro-motor 47 rotates to the position designated by the character of the received signal and displaces the valve 44 so that an amount of fuel sufficient to maintain the required back pressure is allowed to pass to the combustion chamber.

When a decrease in thrust is desired, a signal having a character representative of this desire is transmitted simultaneously to the synchro-motor 36 of the drain valve and the synchro-motor 47 of the fuel flow regulator. The synchro-motor 36 rotates to a position causing the band 27 to slide until the slots 28 of said band are in a predetermined degree of misalinement with the openings 18 of the inner skin 16. The degree of misalinement is determinative of the quantity of air drained from the diffuser section and consequently the reduction of thrust obtained.

The signal voltage received by the synchro-motor 47 of the fuel flow regulator causes said motor to rotate to a position which displaces the valve 44, so that a sufficient amount of fuel is passed to maintain the required back pressure in the combustion chamber. The amount of fuel to be passed to the combustion chamber is dependent upon the quantity of air drained from the diffuser exit which, in turn, is determined by the variation in thrust to be made.

When the drain valve is closed, i.e. when the band 27 blocks off direct passage from the diffuser to the channel 26, no air is drained and the thrust is at a minimum. Thrust may be varied over a wide range by adjusting the amount of air drained through the drain valve.

Figure 8:
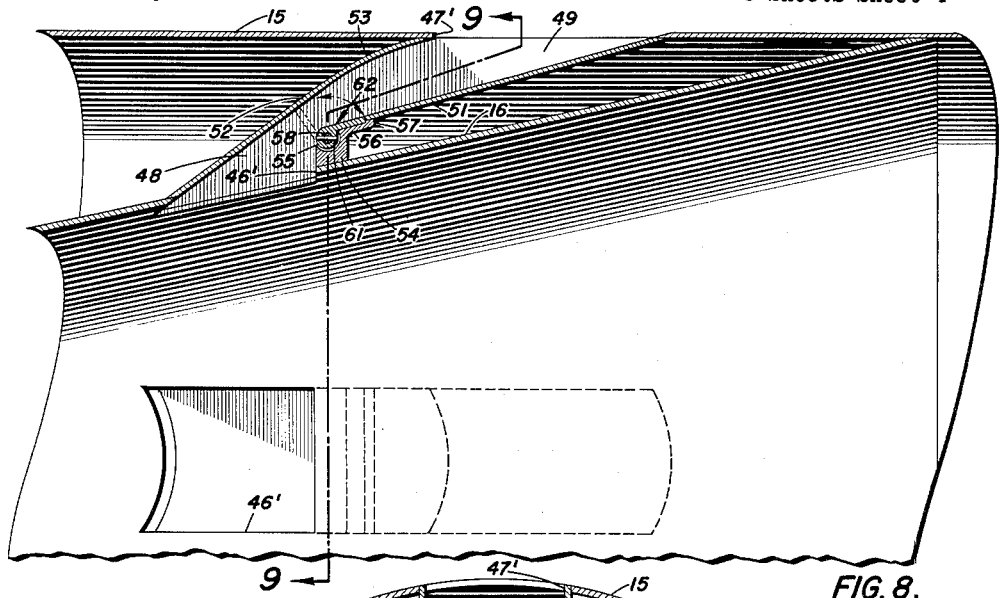
FIG. 8 is a fragmentary section of a missile in the region of the diffuser exit, showing a modification of the invention.
Figure 9:
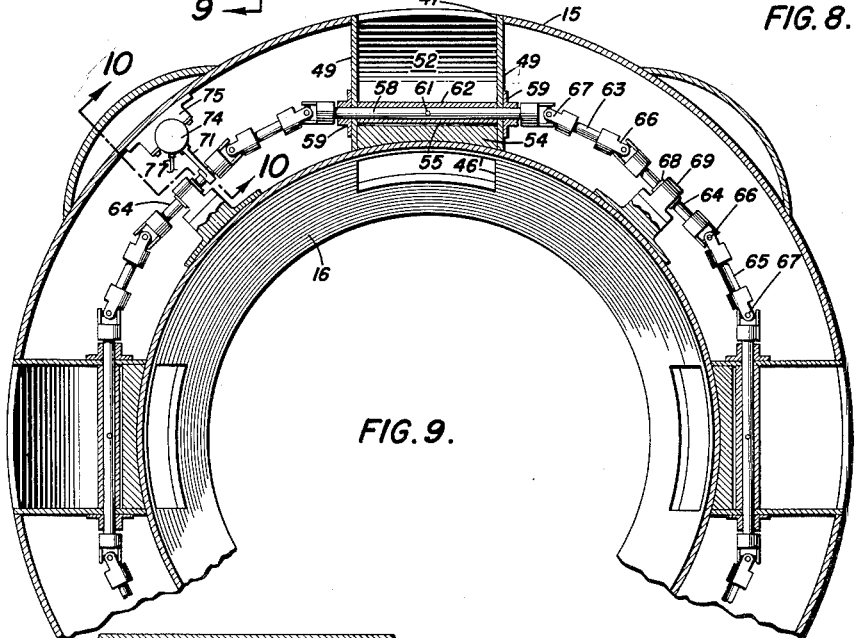
FIG. 9 is a fragmentary sectional view through the missile on line 9—9 of FIG. 8.
Figure 10:
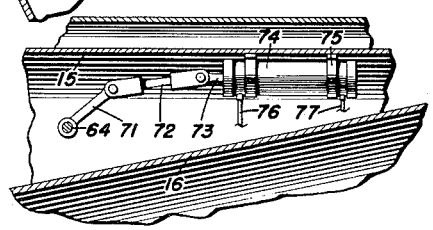
FIG. 10 is a fragmentary section, on line 10—10 of FIG. 9.
Figure 12:
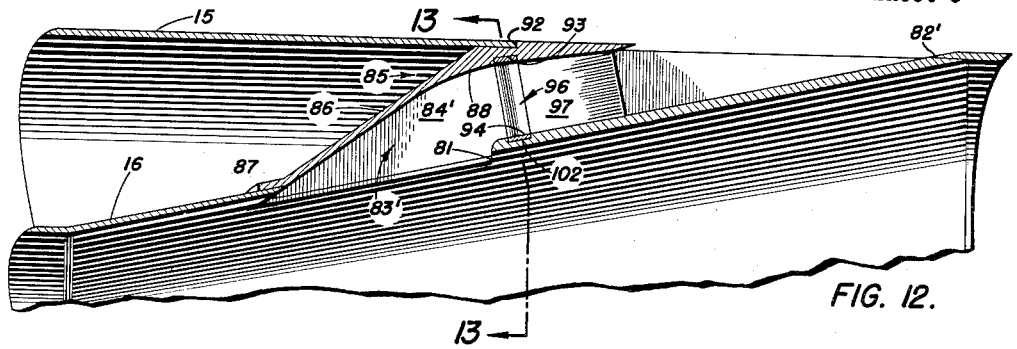
FIG. 12 is a cutaway axial section of a missile in the region of the diffuser exit, showing a second modification of the invention.
Figure 13:
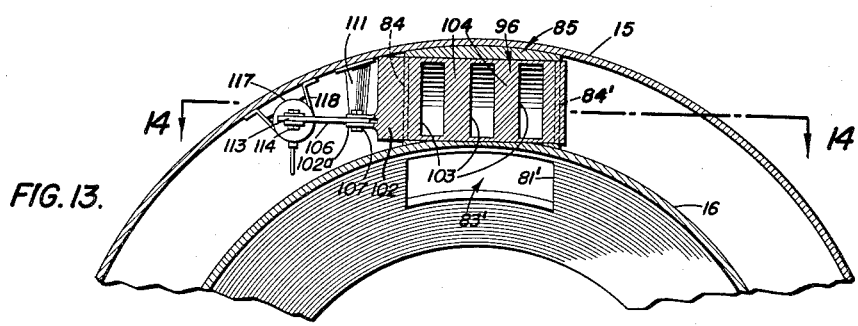
FIG. 13 is a fragmentary sectional view through the missile, on line 13—13 of FIG. 12.

Another form of the drain valve is illustrated in FIGS. 8, 9 and 10, in which the numerals 15 and 16 designate the outer and inner skins, respectively, of a missile. Spaced ninety degrees apart about the periphery of the inner skin 16 in the region of the diffuser exit are four rectangular openings 46'. Similarly, four rectangular ports 47' spaced ninety degrees apart are formed in the outer skin 15 just aft of the openings 46'.

Four channels 48 connect the openings 46' with their corresponding ports 47'. Each channel 48 is formed by two side plates 49, a floor plate 51 and a roof plate 52. The end 53 of the roof plate 52, which is joined to the outer skin 15 is arced inwardly to give a gradual expansion to the channel from the opening 46' to the port 47' such that air passing therethrough expands isentropically.

The side plates 49 and the roof plate 52 each have their respective ends appropriately joined to the inner skin and the outer skin. The fore end of the floor plate 51, however, is secured to a fillet 54, to be described hereinafter, which in turn is secured to the inner skin 16, while the aft end is joined to the other skin. The intersections of the respective plates of the channel are appropriately joined.

The fillet 54 is constructed with a longitudinal groove 55 and a flange 56 having a raised rim 57 which provides support for the fore end of the floor plate 51. The base of the fillet 54 is arcuate to conform to the inner skin 16, to which said fillet is secured in flush relation with the aft edge of the opening 46'.

A shaft 58 is rotatably mounted in suitable bushings 59 mounted on the side plates 49 proximate to each end of the groove 55 of the fillet 54. Fixed to the shaft 58 by a locking pin 61 is a gate 62 resembling a hinge section. The gate 62 is rotatable with the shaft to open or close the drain valve. In the fully open position as shown in the figures the gate 62 lies snugly in the groove 55 and on the flange 56 of the fillet 54 so that the upper surface of said gate is flush with the floor plate 51.

Each of the channels 48 is provided with a fillet 54, a shaft 58 and a gate 62, constructed and arranged as described above. Four shaft trains, each comprised of three connecting rods 63, 64 and 65, interlinked by universal joints 66, inter-connect each shaft 58 of each channel by additional universal joints 67, so that all the shafts will turn in unison and the respective gates 62 will be disposed in like positions at all times.

The centermost connecting rod 64 of each shaft train is journaled in a bushing 68 carried by a bracket 69 which is secured to the inner skin 16. In this manner each train of connecting rods is supported for smooth rotation.

Figure 11:
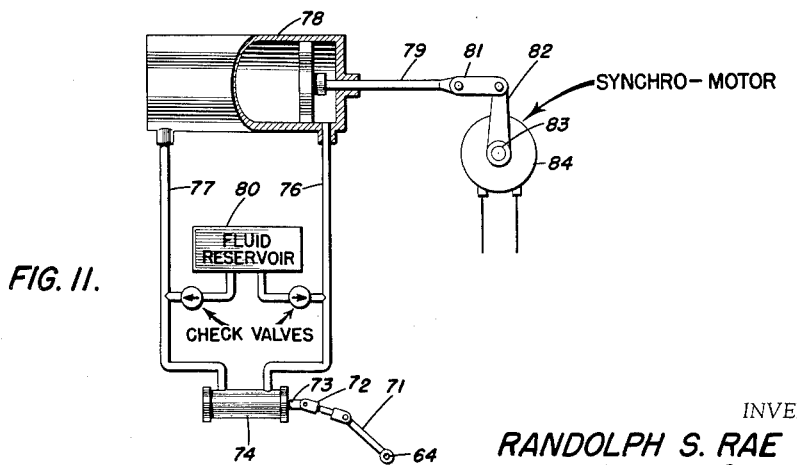
FIG. 11 is a diagrammatic view illustrating the hydraulic system for actuating the drain valve.
Figure 6:
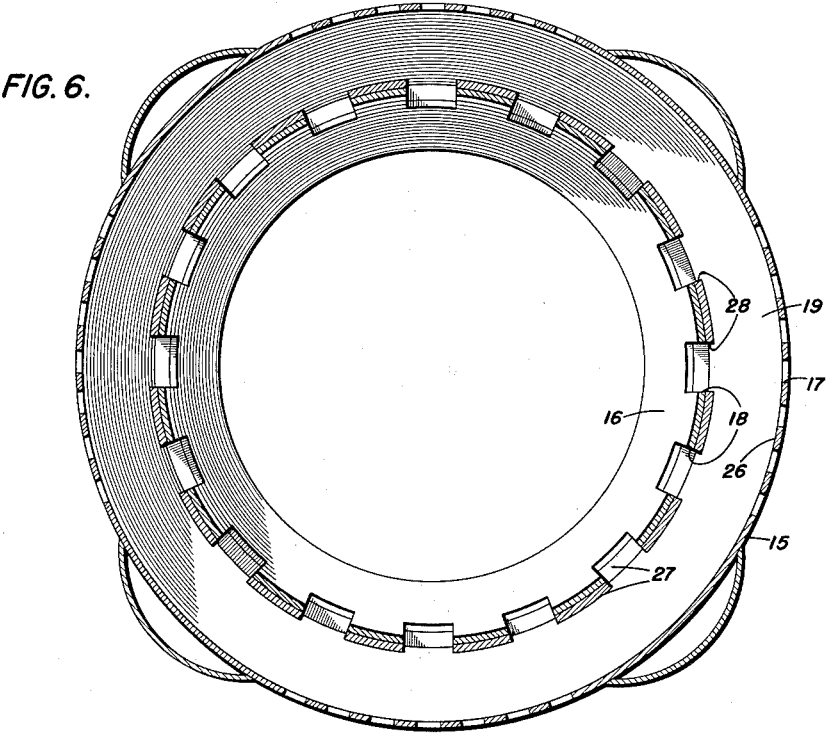
FIG. 6 is a sectional view through the missile body on line 6—6 of FIG. 4.
Figure 7:
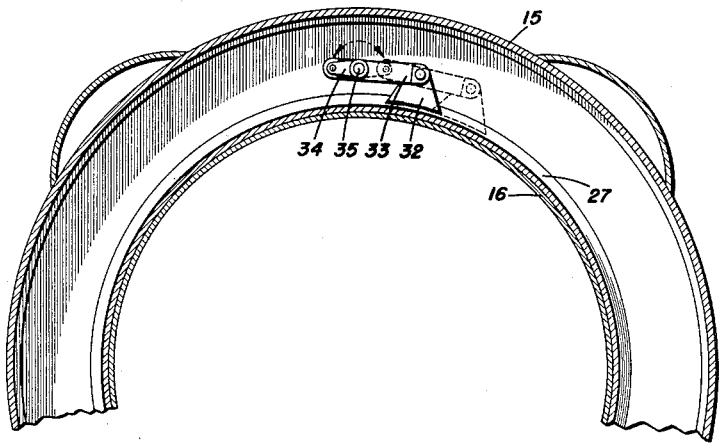
FIG. 7 is a fragmentary sectional view through the missile body on line 7—7 of FIG. 4.

A lever 71 is fixed to the centermost connecting rod 64 of one shaft train, hereinafter called the intermediate mover shaft train, and pivotally connected to a mechanical linkage 72 which in turn is pivotally attached to a piston 73. The piston 73 works in a cylinder 74 which is mounted on the inner surface of the outer skin 15 by a bracket 75. The cylinder 74 is fed with a working fluid through conduits 76 and 77 which are connected to a suitable supply of fluid. This fluid supply may be regulated by signals from the signal source 10. FIG. 11 illustrates diagrammatically an appropriate arrangement for regulating the direction and magnitude of fluid flow through the conduits 76 and 77. It should be understood, however, that any conventional apparatus, such as, for example, any of the numerous types of transfer valves commonly used in servo systems, may be used to regulate the fluid flow. In FIG. 11 there is shown a cylinder 78 into which the conduits 76 and 77 are connected. A piston 79 works in the cylinder 78 and is pivotally connected by a mechanical linkage 81 to a crank 82 which is fixed to the rotor shaft 83 of a synchro-motor 84. A suitable fluid reservoir 80 is connected to the conduits 76, 77 through check valves to replenish the fluid in the system in the event that fluid is lost through leakage.

In operation, the synchro-motor 84 is energized by signals from the source of signals 10. The rotor shaft 83 turns to a position representative of the high-pressure air desired to be drained, thus causing the crank 82 to shift the piston 79. Fluid is made to flow through the conduits 76 and 77 to force the piston 73 working in the cylinder 74 to move to a position determined by the direction and magnitude of fluid flow through said conduits.

Movement of the piston 73 transmits motion through the linkage 72 and the lever 71 to the centermost connecting rod 64 of the intermediate mover shaft train, causing said connecting rod and said intermediate shaft train to rotate. This rotation is transmitted to each shaft 58 of each channel 48 for simultaneously swinging each gate 62 to a position predetermined by the character of the signal from the signal source 10. In this manner the gates 62 are caused to control the area of direct flow from the diffuser exit through the channels 48, thus regulating the amount of air drained from said diffuser.

As shown in the drawings, the gates 62 are in the positions of maximum air flow to the atmosphere, i.e. they lie flush with the floor plates 51 of the channels 48. Under these circumstances the piston 73 of the cylinder 74 is drawn within said cylinder and the piston 79 is at the extreme position shown in FIG. 11.

To decrease the air flow through the channels the synchro-motor 84 is energized to rotate in a counter-clockwise direction, causing the piston 79 to move to the left and the working fluid within the cylinder 78 to flow out through the conduit 77 and into the cylinder 74 behind the piston 73. The force exerted by the fluid moves the piston 73 outwardly of the cylinder 74. The fluid in front of the piston 73 flows out through conduit 76 and into the cylinder 78 to compensate for the displacement of said cylinder 78.

The outward movement of the piston 73 causes the centermost connecting rod 64 of the intermediate mover shaft train to turn, thus turning the shafts 58 of each of the four channels 48. The four gates 62 then are caused to swing into their respective channels 48 to obstruct the flow of air through said channels to the atmosphere. The fully closed position of a gate 62 is shown in dotted lines in FIG. 8.

Regulation of the rate of fuel flow to the combustor concurrently with the regulation of air drained from the diffuser exit to the atmosphere is accomplished in the same manner as in the first embodiment.

In still another form of the drain valve, as illustrated in FIGS. 12, 13, 14 and 15, the inner skin 16 is constructed with four openings 81' spaced ninety degrees apart around the periphery thereof in the region of the diffuser exit, and the outer skin 15 is formed with corresponding ports 82' just aft of said openings. Each opening 81' is connected to its corresponding port 82' by a channel 83' which is bounded by two identically shaped side plates 84', a roof plate 85, to be described hereinafter, and a portion of the inner skin 16. The roof plate 85 is composed of a plane intermediate portion 86, an arcuate flange 87 at its fore end and an aft end having a curved internal surface 88, an arcuate external surface 89 conformable with the external surface of the outer skin 15, and an arcuate slot 92 in the fore portion of said external surface to receive that section of said outer skin forming the forward boundary of the port 82'. The flange 87 of the roof plate 85 is secured to the inner skin 16 just forward of the opening 81 and the aft end of said roof plate is secured to the outer skin 15. The side plates 84' are each secured to the inner and outer skins and, in addition, to the roof plate at the appropriate intersections therewith.

The curved internal surface 88 of the roof plate 85 and the external surface of the inner skin 16 proximate to the aft end of the opening 81 are provided with lateral slots 93 and 94, respectively. The side plates 84' are each formed with a rectangular opening 95 disposed in such a manner that when the respective plates are assembled to form a channel 83', said opening 95 in each of said side plates meets the corresponding ends of the slots 93 and 94.

A gate 96, to be described in detail hereinafter, is slidably mounted in the slots 93 and 94 and extends through the rectangular openings 95 in the side plates 84'. Within each channel 83' and secured at the top and bottom to the roof plate 85 and the inner skin 16, respectively, are two airfoils 97, which, however, have a plane leading surface 98 and a tapering trailing portion 99. At each side of the channel 83' and secured to the side plates 84' are two split airfoils 101 similarly having plane leading surfaces and tapering trailing portions. The airfoils 97 and 101 are disposed in the channels in such a manner that their leading surfaces abut the gate 96.

Figure 14:
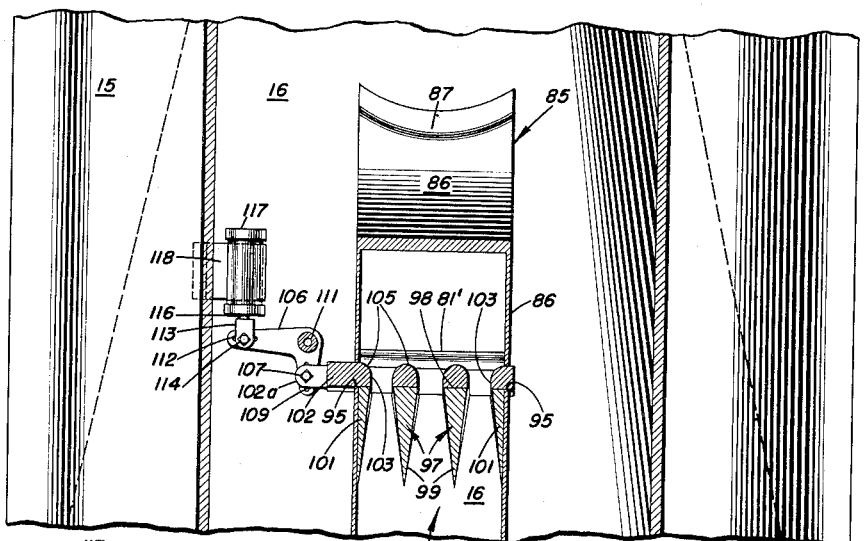
FIG. 14 is a fragmentary view in section, on line 14—14 of FIG. 13.
Figure 15:
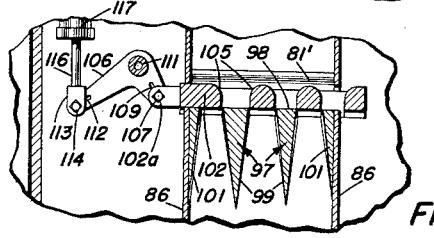
FIG. 15 is a fragmentary view in section similar to FIG. 14 but showing the drain valve of the second modification in closed position.

The gate 96 is constituted by a rectangular block 102 having three rectangular ports 103 of substantially the same height and width as the openings between the airfoils 97, said ports forming two struts 104 which correspond in width to the leading surfaces 98 of said airfoils. As depicted in FIGS. 14 and 15, the portions of the block 102 which would confront an airstream flowing through the channel 83' are provided with rounded surfaces 105 to avert turbulent flow in the ports 103.

There is further provided on an outer end of the block 102, a forked projection 102a for receiving one arm of an L-shaped plate 106. A bolt 107 passes through apertures 108 formed in the ends of said forked projection and a slot 109 formed in the arm of said L-shaped plate 106 which is mounted for pivotal motion on a post 111. The other arm of the plate 106 also has a slot 112 cut therein and is movably attached to a U-shaped linkage 113 by means of a bolt 114 which passes through the slot 112 and apertures 115 provided in the legs of said linkage.

The linkage 113 is secured to the outer end of a piston 116 in a cylinder 117, attached to the inner surface of the outer skin 15 by straps 118. The cylinder 117 and actuating system therefor are of substantially the same construction as those described in relation to the modification as shown in FIGS. 8, 9, 10 and 11, and therefore need no further description here.

It will be noted that each of the four channels 83' is provided with an arrangement of airfoils 97, a gate 96, and a gate actuating mechanism, constructed and arranged as described above. In addition, unlike the preceding modification, each gate 96 has an individual actuating system including a cylinder and a piston, a hydraulic fluid, conduits, a fluid regulating mechanism, and a synchro-motor.

In operation, the actuating systems regulating the position of the gates 96 function in a manner similar to that of the modification shown in FIGS. 8, 9, 10 and 11. Generally, when it is desired to close a gate 96, hydraulic fluid is made to flow into the cylinder 117 such that the piston 116 is forced outwardly. Such motion of the piston pivots the L-shaped plate 106 to slide the gate 96 along the slots 93 and 94 and displace the ports 103 of said gate from alinement with the openings between the airfoils 97.

It is preferable that all four of the gates be actuated in unison to permit air to flow through the channels 83' at substantially equal rates. In this manner the thrust developed by the efflux of the air to the atmosphere will be balanced in all directions and guidance of the missile will not be impaired.

Because of the shape of the channels, air flowing therethrough experiences a gradual expansion which is essentially isentropic. Therefore, the velocity of the effluent air is only slightly less than when it entered the diffuser and the drag forces produced by said effluent air are reduced to a minimum.

Obviously many modifications and variations of the present invention are possible in the light of the above teachings. It is therefore to be understood, that within the scope of the appended claims, the invention may be practiced otherwise than as specifically described.

What is claimed is:

1. In a ramjet missile a diffuser having a plurality of circumferentially disposed spaced ports, a combustion chamber, a fuel injection system for introducing fuel into said combustion chamber, valve means for controlling the introduction of fuel to vary the pressure in the combustion chamber, a synchro-motor for actuating said valve means responsive to signals representative of a desired variation of thrust, a band having a plurality of openings, said band being mounted rotatably around said diffuser over said ports, and a second synchro-motor for rotating said band to vary the size of said ports responsive to signals representative of said desired variation of thrust.

2. A ramjet missile comprising, a duct for receiving high pressure fluid and including a diffuser having a plurality of channels leading from said diffuser to the exterior of said missile, said channels gradually increasing in size from said ports so as to isentropically expand air passing therethrough to the missile exterior a combustion chamber in the duct downstream of the diffuser, a fuel injection system for introducing fuel into said combustion chamber, and valve means associated with said channels for controlling the flow therethrough to regulate the pressure in said diffuser.

3. A ramjet missile comprising, a duct for receiving high pressure fluid and having inner and outer walls defining a diffuser section and a combustion section and channels leading from said diffuser section to the exterior of the missile, said channels being directed rearwardly at an angle to the exterior surface of said duct, a plurality of valves mounted in said channels for controlling the flow therethrough to regulate the pressure in said diffuser, means between the inner and outer walls for actuating said valves responsive to signals representative of a desired variation in thrust, means for injecting fuel into said combustion chamber, a second valve for controlling the rate of fuel injection to regulate the pressure in said combustion chamber, and means for actuating said second valve responsive to signals representative of said desired variation in thrust, said first and last mentioned means cooperating to maintain a constant back pressure at the mouth of the duct in a condition of changing diffuser pressures, whereby the shock wave present during normal flight of the missile will be maintained in a position for optimum missile operation.

4. An arrangement as set forth in claim 3 wherein each of said valves includes a gate which is shiftable into its respective channel to vary the flow therethrough.

5. An arrangement as set forth in claim 3, wherein each of said valves includes a gate slidable into its respective channel to vary the flow therethrough.

6. An arrangement as set forth in claim 3, wherein each of said channels is provided with a plurality of airfoils disposed in spaced relation, and each of said valves includes a gate having openings corresponding to the space between each of said airfoils, said gate being slidable in its respective channel to vary the flow therethrough.

7. A ramjet missile comprising, a duct for receiving high pressure fluid and having a diffuser section, a combustion section communicating with the diffuser section, said diffuser section having channels leading therefrom to the exterior of the missile, said channels being directed rearwardly at an angle to the exterior surface of said duct, a rotatable band surrounding the diffuser section and adapted to block off said channels, said band having a plurality of spaced openings adapted for alinement and disalinement with said channels to regulate the pressure in said diffuser section, means for actuating said band responsive to signals representative of a desired variation in thrust, means for injecting fuel into said combustion section, a valve for controlling the rate of fuel injection to regulate the pressure in said combustion section, and means for actuating said first mentioned means and said valve and responsive to signals representative of said desired variation in thrust.

8. In a ramjet missile, a duct having inner and outer walls, said inner wall defining a diffuser and a combustion chamber communicating with the diffuser, said inner wall having a series of circumferentially arranged ports near the downstream end of the diffuser and said outer wall having ports communicating with the exterior of the missile, a ring between the walls in the region of the ports, an annulus between said walls and spaced from the ring to define an annular channel communicating between the ports in the inner and outer walls, a rotatable band surrounding the inner wall in the region of the ports therein and having slots corresponding to said inner wall ports, and means for rotating the band for bringing the slots into registry with the inner wall ports for diverting air from the diffuser.

9. In a ramjet missile, a duct having inner and outer walls, said inner wall including a diffuser having an inlet, an outlet, a combustion chamber communicating with the inlet and ports at the downstream end of the diffuser, said outer wall having ports disposed to communicate with the first mentioned ports and the exterior of the missile, and means between the walls and operable for diverting a port of fluid flow in the diffuser through said ports.

10. In a ramjet missile having a duct, a diffuser having a plurality of circumferentially disposed ports, a combustion chamber connected with the diffuser, a fuel injection system for introducing fuel into said combustion chamber, said system including means for controlling the introduction of said fuel to vary the pressure in said combustion chamber, and means for controlling the size of said ports to vary the pressure in said diffuser, said last mentioned means comprising a rotatable band surrounding the diffuser and having a plurality of spaced openings, and means for rotating said band for opening or closing the ports.

11. A ramjet missile comprising a duct receiving high pressure fluid and including a diffuser having an inlet, an outlet, and having a wall formed with a plurality of circumferentially disposed spaced ports, and an equal number of channels leading from said ports to the exterior of the missile, said channels gradually increasing in size from said ports so as to isentropically expand air passing therethrough to the missile exterior.

12. The arrangement set forth in claim 11, including valve means associated with said channels for controlling the flow therethrough to regulate the pressure in the diffuser.

References Cited in the file of this patent

UNITED STATES PATENTS

| 2,540,594 | Price | Feb. 6, 1951 |
| 2,589,945 | Leduc | Mar. 18, 1952 |

FOREIGN PATENTS

| 614,548 | Great Britain | Dec. 17, 1948 |
| 622,348 | Great Britain | Apr. 29, 1949 |